(12) United States Patent
Xavier da Silveira et al.

(10) Patent No.: US 7,292,516 B1
(45) Date of Patent: Nov. 6, 2007

(54) SENSOR OPTIMIZED FOR PHASE DETECTION IN PAGE-BASED OPTICAL DATA STORAGE

(75) Inventors: Paulo E. Xavier da Silveira, Boulder, CO (US); Robert R. McLeod, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 445 days.

(21) Appl. No.: 11/027,536

(22) Filed: Dec. 30, 2004

(51) Int. Cl.
*G11B 7/00* (2006.01)

(52) U.S. Cl. ............... 369/103; 369/44.14; 369/44.18; 369/44.41; 369/112.01

(58) Field of Classification Search ................ None
See application file for complete search history.

(56) References Cited

U.S. PATENT DOCUMENTS

2005/0249095 A1* 11/2005 Tanaka et al. .............. 369/103
2005/0254392 A1* 11/2005 Meyrueis et al. ...... 369/112.01

OTHER PUBLICATIONS

Geoffrey W. Burr, *Holographic Storage*, Encyclopedia of Optical Engineering, Marcel Dekker, Inc., 2003.
Geoffrey W. Burr, et al. *Modulation Coding For Pixel-Matched Holographic Data Storage*, Optical Letters, vol. 22, No. 9, Optical Society of America, 1997.
Kurt W. Getreuer, *Optical Disk Drives—Mechanical Design And Servo Systems*, Encyclopedia of Optical Engineering, Marcel Dekker, Inc., 2003.
Jean Schleipen, et al., *Optical Heads*, Encyclopedia of Optical Engineering, Marcel Dekker, Inc., 2003.
Nicholas Blanc, *CCD versus CMOS—has CCD imaging come to an end?*, Photogrammetric Week '01', D. Fritsch and R. Spiller Eds. Wichmann Verlag, Heidelberg, 2001.
H. Zhang et al., "Multi-layer Optical Data Storage Based On Two-photon Recordable Fluorescent Disk Media," *Proc. of IEEE 18th Symposium on Mass Storage Systems and Technologies*, pp. 225-236, San Diego, 2001.
Paulo E. X. Silveira, *Optoelectronic Signal Processing Using Finite Impulse Response Neural Networks*, Ph. D. dissertaton, University of Colorado, 2001.
Simon Haykin, *Digital Communications*, John Wiley & Sons, 1988, pp. 567-588.

* cited by examiner

*Primary Examiner*—Muhammad Edun
(74) *Attorney, Agent, or Firm*—Brooks Kushman P.C.

(57) ABSTRACT

A system for phase detection in page-based optical data storage involves a number of features that may be used individually or in combination to provide optimizations and to facilitate the heterodyne detection of the modulated readout signal beam. In one aspect, alignment sensors provide signals indicative of angular misalignment between the heterodyne reference beam and the signal beam, and a feedback control system aligns the reference beam with respect to the signal beam. In another aspect, a differential detection approach is utilized. In yet another aspect, a scanning approach is used wherein the reference beam is scanned over approximately a wavelength of phase difference to cause interference fringes to shift over the photodetector pixel array. Each pixel detects the signal at the phase value that cancels out localized variations of the wavefront, thus increasing the tolerance of the system to phase errors and to angular misalignments.

12 Claims, 4 Drawing Sheets

SENSOR OPTIMIZED FOR PHASE DETECTION IN PAGE-BASED OPTICAL DATA STORAGE

BACKGROUND OF THE INVENTION

1. Field of the Invention

The invention relates to page-based optical data storage. The invention further relates to the readout of phase-modulated signals in page-based optical data storage applications.

2. Background Art

In page-based optical data storage, a page of data is read by imaging a two-dimensional data page onto a two-dimensional detector. The detector detects the image, and the image is subsequently processed to decode the data.

Page-based optical data storage technologies and, in particular, holographic data storage (HDS), have benefited greatly from the recent development of CMOS active pixel sensors (also known as APS detectors), such as the ones available today in high resolution digital cameras. These sensors, compared to traditional charge-coupled device (CCD) detectors, present the advantages of lower unit cost (due to the simpler design and manufacturing) and design flexibility provided by the CMOS process, allowing more functionality to be included in the detector chip. However, these sensors have invariably been optimized for consumer imaging and machine vision applications, not for data storage.

Most page-based optical data storage approaches currently pursued use amplitude modulation of the optical wavefront (i.e., on-off pixels). Significant improvements in storage density and BER can be achieved by using phase modulation (e.g., 0 to $\pi$ phase modulation of the pixels followed by coherent PSK detection). Some of the advantages are: higher dynamic range (e.g., in holographic data storage, signal power falls as $1/M$ instead of $1/M^2$, where M is the number of the overlapped holograms, typically about $10^2$), very low intensity of the DC spot in the focal plane (translating into more efficient use of the available dynamic range and lower chance of damage to the material), heterodyne gain at detection, 3-dB gain in SNR and common-mode noise rejection by using differential detection, lower BER for the same SNR by using coherent PSK detection (compared to incoherent ASK), and lower crosstalk between neighboring pixels and between collocated pages, due to noise cancellation.

These advantages are provided at the cost of higher hardware complexity and higher sensitivity to alignment.

Background information may be found in Paulo E. X. Silveira, *Optoelectronic Signal Processing Using Finite Impulse Response Neural Networks*, Ph.D. dissertation, University of Colorado, 2001; Geoffrey W. Burr, *Holographic Storage*, Encyclopedia of Optical Engineering, Marcel Dekker, Inc., 2003; Nicolas Blanc, *CCD versus CMOS—has CCD imaging come to an end?*, Photogrammetric Week '01', D. Fritsch and R. Spiller Eds. Wichmann Verlag, Heidelberg, 2001; Jean Schleipen et al., *Optical Heads*, Encyclopedia Of Optical Engineering, Marcel Dekker, Inc., 2003; and Simon Haykin, *Digital Communications*, John Wiley & Sons, 1988.

For the foregoing reasons, there is a need for an improved sensor that is optimized for phase detection in page-based optical data storage and that addresses the challenges posed by heterodyne phase detection.

SUMMARY OF THE INVENTION

It is an object of the invention to provide an improved system for page-based optical data storage including a sensor optimized for phase detection in page-based optical data storage.

The invention comprehends a system for page-based optical data storage. A photodetector sensor array is positioned to receive a data page when the data page is optically read from the storage medium. The sensor includes a pixel array, and preferably is in the form of a CMOS APS array. A processing arrangement processes the data from the sensor array to determine the most likely correct value of the bits read.

According to the invention, the photodetector sensor array is improved in that it is optimized for phase detection in page-based optical data storage applications. The invention involves a number of features that used singly, or in various combinations, provide an improved sensor.

In carrying out the invention, a system for phase detection in page-based optical data storage is provided. The system comprises a storage medium, a photodetector sensor array, and a coherent phase-shift keyed detection system. The photodetector sensor array is positioned to receive a data page when the data page is optically read from the storage medium (e.g., by optical diffraction, reflection or transmission through the storage medium). Phase detection is typically performed by aligning a signal beam with a reference beam and coherently mixing the two, resulting in a mixed signal proportional in amplitude to the phase of the signal beam, in a process commonly known as heterodyne detection. In the invention, the photodetector sensor array includes a pixel array responsible for detecting the phase of each corresponding pixel in the data page. The coherent phase-shift keyed detection system is coupled to the photodetector sensor array and is responsible for processing the data and determining the most likely correct value of the bits read.

The system further comprises a feedback control system for aligning the reference beam with respect to the signal beam. A plurality of alignment sensors are positioned about the pixel array. Differences in sensor signals are indicative of angular misalignment between the reference beam and the signal beam. The feedback control system processes the differences in sensor signals and aligns the heterodyne reference beam with respect to the signal beam.

The individual pixels in the photodetector sensor array may be configured to filter a DC bias resulting from the use of the coherent phase-shift detection system. In a preferred approach, the plurality of alignment sensors includes four alignment sensors with an alignment sensor in each quadrant of the photodetector sensor array.

Further, in carrying out the invention, a system for phase detection in page-based optical data storage is provided. The system comprises a storage medium and a beam-splitter. A signal beam is generated by reading out the storage medium. The beam-splitter aligns the signal beam with a heterodyne reference beam. The system further comprises a first photodetector sensor array and a second photodetector sensor array. Each photodetector sensor array receives one of the beams from the output ports of the beam-splitter. A differential detection system processes the outputs of the first and second photodetector sensor arrays and determines the most likely correct value of the bits read. The first and second photodetector sensor arrays may be configured to cancel a DC offset by balancing the inputs to the differential detection system.

Still further, in carrying out the invention, a method for phase detection in page-based optical data storage is provided. The method is used with a system including a storage medium, a photodetector sensor array positioned to detect a data page when the data page is optically read from the storage medium by aligning a signal beam with a reference beam, and a coherent phase shift-keyed detection system. The coherent phase-shift keyed detection system is coupled to the photodetector sensor array for phase detection to process the data to determine the most likely correct value of the bits read. The method comprises scanning over a wavelength of phase difference with the reference beam to cause interference fringes in the reconstructed object beam to shift over the pixel array. The method further comprises capturing multiple data points for each pixel during the scanning. In a preferred approach, for each pixel a most readable phase difference is determined and the user data at each pixel is determined as the data point at the most readable phase difference.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
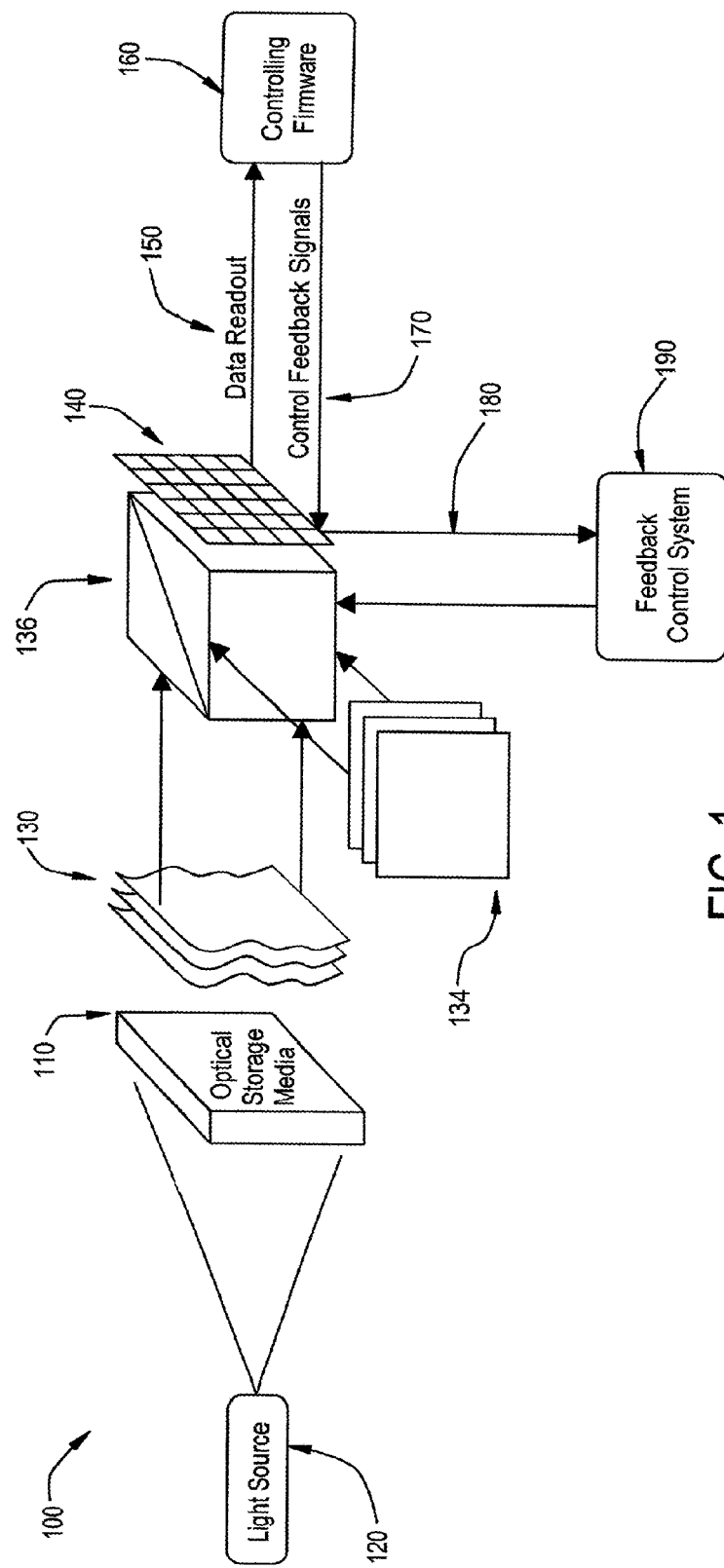
FIG. 1 is a page-based optical data storage system made in accordance with the invention.

FIG. 1 depicts the readout operation of a generic page-based optical data storage system 100 (e.g., implemented holographically, diffractively, etc). Optical medium 110 is illuminated by light source 120, providing a plane 130 of modulated signals representing the stored data. The modulated signals and the optical heterodyne reference signals 134 are made collinear by using beam steering optics (e.g., using the beam-splitter 136). Then, they are coherently interfered and detected by the photodetector array 140, which is optimized for phase detection in page-based optical data storage. From the photodetector array, the data readout 150 is transferred out to the controlling firmware 160. The controlling firmware also transmits control feedback signals 170 to the photodetector array, directing it on how to adjust its optical detection parameters. The photodetector array 140 also transmits feedback control signals 170 to the feedback control system 190. The feedback control signals provide information about the misalignment (e.g., by conveying a voltage signal with amplitude proportional to the amount of misalignment, and a sign proportional to the direction of the misalignment). The feedback control system 190 uses the feedback control signals to adjust the relative alignment between the modulated signal beam 130 and the reference beam 134 (e.g., by realigning the beam-splitter 136). The details of the operation of the page-based optical data storage system are readily understood by one of ordinary skill in the art. FIG. 1 illustrates page-based data readout in general. It is appreciated that the invention may be implemented in other ways differing from that shown in FIG. 1.

Figure 2:
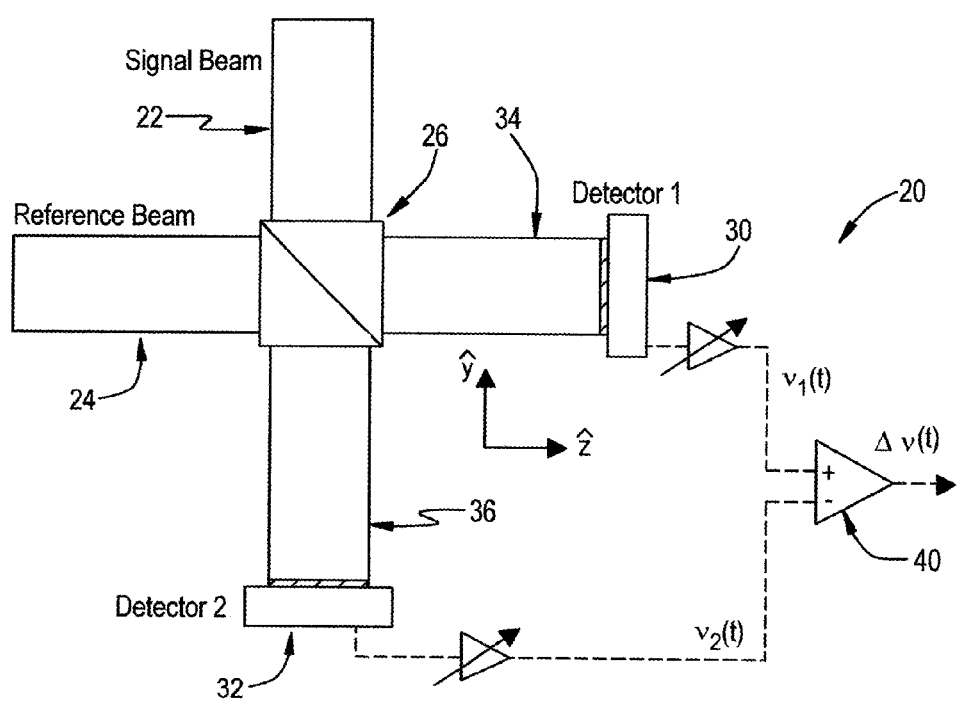
FIG. 2 illustrates differential heterodyne phase detection.

An optically phase modulated bit signal read out from a two-dimensional page at row i, column j, can be represented by $$E_{ij} = \frac{\eta|E_0|}{2}\exp\left[i\left(\frac{2\pi nct}{\lambda} - \frac{2\pi n}{\lambda}\hat{k}_{ij}\cdot\hat{z} + \phi_{ij}\right)\right] + c.c.$$

where $|E_0|$ is the amplitude of the optical beam used for readout, $\eta$ is the amplitude modulation efficiency of the storage medium, $\lambda$ is the wavelength of light, c is the speed of light in a vacuum, n is the index of refraction of the medium, $$\hat{k}_{ij}\cdot\hat{z}$$

is the cosine of the angle between the direction of propagation of the signal beam and the direction of the detector 30 with reference to FIG. 2, and $\phi_{ij}$ is the pixel phase modulated by the optical storage medium.

FIG. 2 illustrates a differential heterodyne detector at 20, where the signal beam 22 is combined with a heterodyne reference beam 24 in a beam-splitter 26. The combined beam is then imaged towards one (simple heterodyne detection, not specifically illustrated) or two (differential heterodyne detection, illustrated in FIG. 2) output sensor arrays 30 and 32. The laws of conservation of energy dictate that the signals 34 and 36 at the output ports of the beam-splitter must be 180° out of phase, requiring the calculation of the signal difference 30 and 32, but providing 3-dB gain and common-mode noise rejection. When the heterodyne reference wave is sufficiently coherent with the signal wave, the output voltage for pixel ij is given by $$v_{ij}^1 = \alpha\left\{\frac{|E_r|^2 + |E_0|^2}{4N} + \frac{|E_r||E_0|}{2N}\cos\left[\phi_{ij} - \frac{2\pi n}{\lambda}(\hat{k}_{ij} - \hat{k}_r)\cdot\hat{z}\right]\right\}$$

where $\alpha$ is a constant of proportionality, N is the number of pixels on the spatial light modulator (SLM), $|E_r|$ is the amplitude of the reference wave (with a spatially flat phase, assumed to represent the zero phase), and $$\hat{k}_r$$

is the direction of propagation of the reference beam (aligned by adjusting the beam-splitter). In the case of perfect alignment, $$\hat{k}_{ij} - \hat{k}_r = 0,$$

the output signal voltage reduces to $$v_{ij}^1 = \beta_1 I_{DC} + \beta_2 \cos\phi_{ij}$$

where $\beta_1$ and $\beta_2$ are proportionality constants and $I_{DC}$ is a constant DC intensity that should be filtered out, or which is cancelled out by the differential detection. In the case of differential detection, there is an intrinsic 3-dB gain due to the phase difference between the two arms of the heterodyne interferometer 20, yielding $$\Delta v_{ij} = 2\beta_2 \cos\phi_{ij}$$

Note that $\cos\phi_{ij} = \pm 1$, and this provides a bipolar signal representation instead of the unipolar signal provided by amplitude modulation. In order to keep all of the pixels in the photodetector aligned with the reference wave, the system must have a maximum angular misalignment δ given by $$\sqrt{N}p \sin \delta \ll \lambda/n$$

where p is the pixel pitch and, for p=5 µm, the system must have δ<<20 arc sec. Note that this is about the same order of magnitude of the angular resolution required for the angular multiplexing of holograms used in holographic data storage, putting it within the range of capabilities of commercially available galvanometers used for angular control of optical components, but requiring active control of the alignment.

Figure 3:
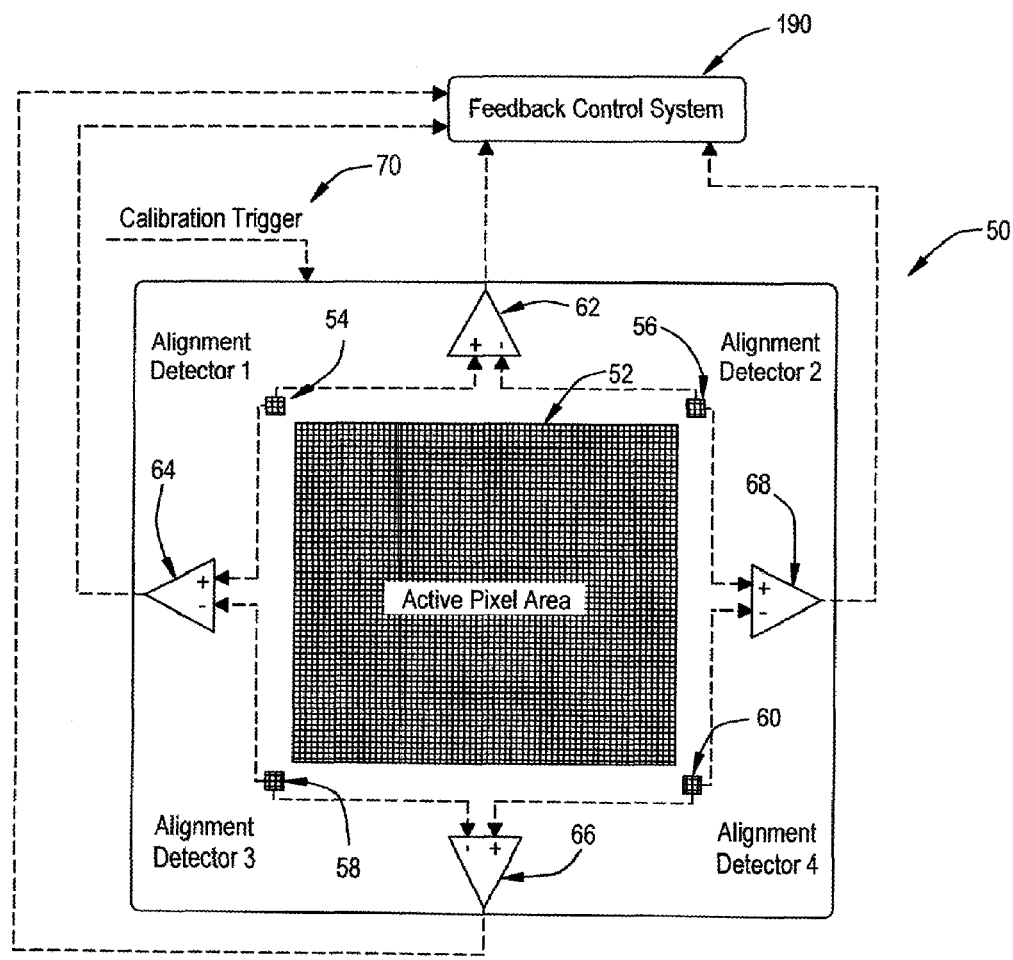
FIG. 3 illustrates alignment detectors placed at the corners of the active pixel area to provide a differential feedback signal that grows with the relative angle between the reference beam and the signal beam.
Figure 4:
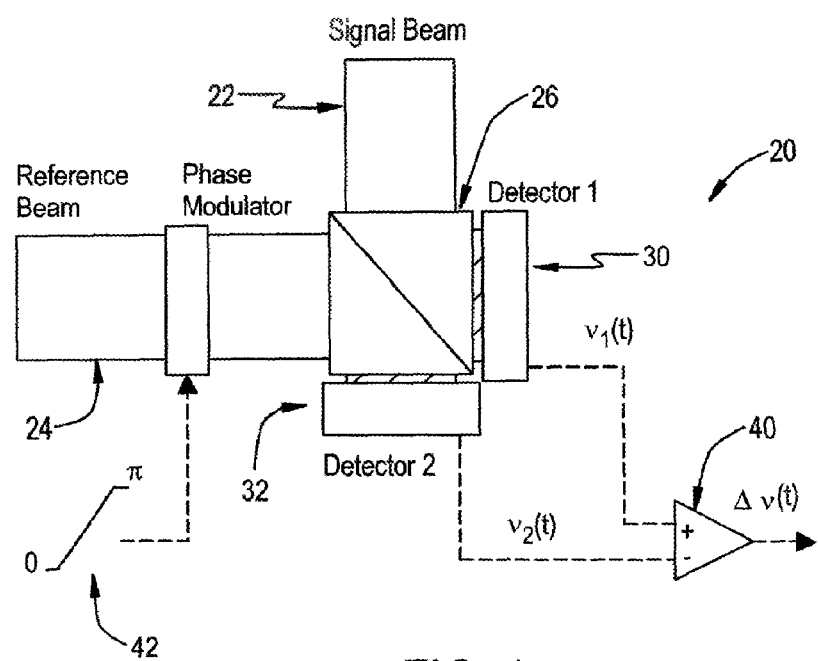
FIG. 4 illustrates a modulator ramping the phase of the reference arm while the photodetectors sample the ramp.

With reference to FIGS. 3-4, the preferred embodiment of the invention comprehends a number of features in a photodetector array that optimize the sensor for holographic data storage using phase detection.

As best shown in FIG. 3, a sensor 50 (preferably a CMOS APS array) includes an active pixel area 52. Sensor 50 includes symmetric and diametrically opposed detectors 54, 56, 58, 60. The detectors feed differential amplifiers 62, 64, 66, 68. In this way, the detectors provide a voltage difference proportional to the cosine of angular difference in the x-axis (Detectors 54 and 58 feeding Differential amplifier 64, or Detectors 56 and 60 feeding Differential amplifier 68, or a combination of detected signals) and y-axis (Detectors 54 and 56 feeding Differential amplifier 62, or Detectors 58 and 60 feeding Differential amplifier 66, or a combination of detected signals). More specifically, when the angular misalignment between the heterodyne reference and signal beams is small (less than a wavelength), the difference signals from the differential amplifiers 62, 64, 66, 68 can be used by a feedback control system 190 to align the reference beam with respect to the signal beam. In a preferred approach, the detectors 54, 56, 58, 60 are larger and may be slower than the photosensors in the active pixel area 52. Uniform illumination by the reference beam alone can be used to calibrate the gain of the alignment detectors, triggered by an external calibration trigger 70.

In addition, each detection pixel in sensor 50 may be configured to perform on-chip filtering of the DC bias resulting from the use of heterodyne detection. The filtering can be done prior to analog-to-digital conversion, thus better using the available dynamic range of the analog-to-digital converter. The chip also decodes the detected data, preferably using coherent phase-shift keyed binary detection.

As best shown in FIG. 4, the preferred embodiment of the invention may utilize two detectors 30, 32 and a beamsplitter 26. In this way, the invention comprehends a compact module suited for differential heterodyne detection with less degrees of freedom required for alignment. In a preferred approach, on-chip gain controlled by an external input signal is provided. This feature may be used to balance a differential heterodyne detection and to cancel out the DC offset, with the added benefit of removing common-mode noise (e.g., relative intensity noise of the laser source, fluctuations of the electrical power supply, etc).

With continuing reference to FIG. 4, the reference beam is indicated at 24 while the signal beam is indicated at 22. Differential detection system 40 calculates the differences between the outputs of the first and second heterodyne detectors and processes the data to determine the most likely correct value of the bits read.

In a preferred embodiment, and as best illustrated in FIG. 4, in a calibration step a phase ramp 42 is used to scan over about a wavelength of phase difference in the reference beam while capturing multiple data points of a signal beam that is known a priori. The phase ramp can be produced, for example, by a Pockel's cell, or by a piezo-mounted mirror which alters the optical path length. This causes the interference fringes to shift over the surface of any detectors, assuring that each pixel captures at least one valid data point. Prior knowledge of the correct pixel values used in the calibration step is used to determine the correct phase difference at which each pixel value should be read. This phase difference is individually detected and recorded for each pixel location. Next, when an unknown signal beam is read, the phase is once again ramped and each photodetector pixel is read whenever the phase ramp reaches the same phase difference pre-recorded in the phase calibration step. This allows for the compensation of imperfections over the phase front of the diffracted wave, as well as for alignment compensation over a wider range of angles.

It is appreciated that embodiments of the invention provide a number of features for phase detection in page-based optical data storage. These various aspects of the invention may be used individually or in various combinations to achieve improved sensors optimized for phase detection in page-based optical data storage.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for phase detection in page-based optical data storage, the system comprising:
   a storage medium;
   a photodetector sensor array positioned to detect a data page when the data page is optically read from the storage medium by mixing a signal beam with a heterodyne reference beam;
   a phase detection system coupled to the photodetector sensor array to process the data and to determine the most likely correct value of the bits read;
   a feedback control system for aligning the heterodyne reference beam with respect to the signal beam;
   a plurality of alignment sensors positioned about the photodetector sensor array such that differences in sensor signals are indicative of angular misalignment between the heterodyne reference beam and the signal beam; and
   wherein the feedback control system processes the differences in sensor signals and aligns the heterodyne reference beam with respect to the signal beam.

2. The system of claim 1 wherein detection pixels of the photodetector sensor array are configured to filter a DC bias resulting from the use of heterodyne detection.

3. The system of claim 1 wherein the phase detection system performs coherent phase-shift keyed binary detection.

4. The system of claim 1 wherein the plurality of alignment sensors includes four alignment sensors with an alignment sensor in each corner of the photodetector sensor array.

5. A system for phase detection in page-based optical data storage, the system comprising:
   a storage medium;
   a signal beam originated from the optical readout of the storage medium;

a beam-splitter positioned to align the signal beam to a heterodyne reference beam, the beam-splitter presenting two output ports;

a first photodetector sensor array positioned to detect the interference pattern from the first output port;

a second photodetector sensor array positioned to detect the interference pattern from the second output port;

a differential detection system processing the outputs of the first and second phase detection systems to process the data and to determine the most likely correct value of the bits read.

6. The system of claim 5 wherein uniform illumination by the reference beam alone is used to calibrate the gain of the photodetector sensor arrays.

7. The system of claim 5 wherein the first and second photodetector sensor arrays are configured to cancel the heterodyne DC offset by balancing the inputs to the differential detection system.

8. The system of claim 7 wherein balancing of the inputs is performed by a feedback signal that externally controls the gain of each photodetector sensor array.

9. The system of claim 7 wherein the balancing of the inputs to the differential detection system further cancels out common-mode noise.

10. A method for phase detection in page-based optical data storage, wherein a system includes a storage medium, a photodetector sensor array positioned to detect a data page when the data page is optically read from the storage medium by aligning a signal beam with a heterodyne reference beam, a phase detection system used in combination with the photodetector sensor array for phase detection to process the data to determine the most likely correct value of the bits read, the method comprising:

scanning with the heterodyne reference beam over a range of optical phase differences substantially close to a wavelength to cause interference fringes to shift over the photodetector sensor array.

11. The method of claim 10 further comprising:

for each pixel, determining a most readable phase difference and determining the modulated data as the data point at the most readable phase difference.

12. The method of claim 11 further comprising:

a phase calibration step, where a data page known a priori is used for readout and the most readable phase difference for each pixel is determined as the phase difference corresponding to the data point that is closest to the signal of the data page known a priori.

* * * * *